United States Patent [19]

Ketterer

[11] 3,787,783

[45] Jan. 22, 1974

[54] TIME-KEEPING DEVICE WITH TRANSISTOR CONTROL USING OSCILLATING MAGNET

[76] Inventor: Edmund Ketterer, Hansjakob Strasse 7, 7712 Blumberg/ Schwarzwald, Germany

[22] Filed: Apr. 21, 1972

[21] Appl. No.: 246,383

[30] Foreign Application Priority Data

Apr. 21, 1971 Germany ........................ 2119299

[52] U.S. Cl. ............ 331/116 M, 58/23 A, 58/28 A, 318/128, 331/112

[51] Int. Cl. .......................... G04c 3/00, H03b 5/30

[58] Field of Search .........331/112, 116 M; 58/23 A, 58/23 AC, 28 A; 318/128, 132

[56] References Cited

UNITED STATES PATENTS

| | | | |
|---|---|---|---|
| 3,654,757 | 4/1972 | Takamune | 331/116 M X |
| 3,509,437 | 4/1970 | Hashimura | 331/116 M X |
| 3,351,833 | 11/1967 | Gerum | 331/116 M X |
| 3,653,199 | 4/1972 | Inoki et al. | 58/28 A X |

*Primary Examiner*—H. K. Saalbach
*Assistant Examiner*—Siegfried H. Grimm
*Attorney, Agent, or Firm*—Karl F. Ross

[57] ABSTRACT

A drive arrangement for an electronic time-keeping device in which a rotor member is juxtaposed with a stator member, one of the members being provided with a pair of coils including a sensing coil (pick-up coil) and a drive coil. The other member carries a pair of oppositely poled magnets cooperating with the coils. A NPN transistor has a collector-emitter network in series with the direct-current source and the drive coil while the sensing coil is connected in a base-collector network of the transistor.

18 Claims, 10 Drawing Figures

TIME-KEEPING DEVICE WITH TRANSISTOR CONTROL USING OSCILLATING MAGNET

CROSS REFERENCE TO RELATED APPLICATION

The present application is related to my application, Ser. No. 95,661 filed Dec. 7, 1970 and entitled Oscillator With Electrodynamic Drive and Electromagnetic Detection Especially For Use In An Electrical Clock (now U.S. Pat. No. 3,713,047 issued Jan. 23, 1973.

FIELD OF THE INVENTION

The present invention relates to a swinging-mass oscillator or electromagnetic transducer for converting electrical energy (preferably from a direct-current electrical source) into periodical mechanical movement for use, for example, in electronic time-keeping or clockwork devices. Such devices may include watches or clocks driven by battery power, especially monocell direct-current sources. More particularly, the invention relates to an angular oscillation generator or drive arrangement with electrodynamic power pulses and electrodynamic pickup and to associated circuitry and mechanism enabling the oscillator or drive to be used as a timing device in electronic clocks.

BACKGROUND OF THE INVENTION

In the aforementioned copending application and in the literature, there have been described electromagnetic swinging-mass oscillation generating devices and drives for clock works and the like which comprise a drive or power coil and a pick-up or control coil, generally upon one of two relatively rotatable members including, for example, an angularly oscillator member (rotor) and a relatively stationary member (stator).

Permanent-magnet means may be provided on the other member and can have induction or magnetic-field axes perpendicular to the plane of rotation and perpendicular to the effective magnetic axes of the coils so that, when the permanent-magnet means swings over the pick-up coil, an electrical pulse is induced therein to operate an appropriate circuit designed to apply power pulses to the drive coil whose induced magnetic field acts upon the permanent magnet means to displace the latter.

One of the problems with prior art systems of this type, which use so-called blocking oscillators, is that the control pulses are applied to time-constant networks of the RC (resistor-capacitor) type. The conventional systems are highly sensitive to changes in the source voltage, to variations in temperature and to other environmental variations. To improve the operation of such systems, it has been proposed to provide diodes and like voltage controlling arrangement which, although representing some improvement, are not able to allow full utilization of the input or control pulses. Furthermore, at source voltage of, say, 1.5V, as is the case with single-cell sources, the diodes do not act in the usual way as non-linear resistances and are unable fully to smooth out or eliminate voltage variations. The alternating-current signal induced in the electromagnetic coils also are damped by the diodes so that the system becomes less accurate and less controllable over long periods.

OBJECTS OF THE INVENTION

It is the principal object of the present invention to provide an improved electronic-control mechanism for a time-keeping device or clock work whereby the aforementioned disadvantages are avoided and improved precision under varying environmental conditions is obtained.

Another object of the invention is to provide a circuit and mechanism for an electronic clock which is more stable with respect to temperature and input voltage variation than prior art devices.

Still another object of the invention is to provide a clock-work mechanism of the character described with an improved self-sustaining quality. It is still another object of the invention to provide a system which extends the principles originally set forth in my copending application discussed above.

SUMMARY OF THE INVENTION

These objects and others are attained, in accordance with the present invention wherein the permanent-magnet means, preferably on the rotor member, comprises a pair of angularly spaced permanent magnets which are generally parallel to one another or have generally parallel induction axes and which are oppositely poled, i.e. have oppositely directed North and South magnetic poles. The permanent magnets cooperate with the pick-up and power coils mentioned earlier to generate a train of control pulses which are applied, according to the present invention, via the pick-up coil between the base and the collector of a transistor (preferably of the NPN type) whose emitter-collector network lies in series with the direct current source and the output or power coil.

The invention thus resides in part in a transistor-control circuit using in NPN output transistor as described in my aforementioned application but wherein the base of the NPN transistor is connected to one terminal of the control coil while the other terminal of the control coil is connected through a resistor to the collector electrode of this transistor. The circuit arrangement allows the alternating current traversing the coils to be generated in the control coil without shunting of the latter by a low resistance whereby the full signal of the control coil can be used at the full amplitude as induced. As a consequence, a feedback of electromagnetic force to the oscillating member is prevented and self sustaining operation is guaranteed without any of the difficulties hitherto encountered.

According to a further feature of the invention, the terminal of the detecting coil remote from its connection to the base of the transistor, is connected to one terminal of a capacitor bridged across the drive coil in series with its resistor via the bias resistor connected between the detector coil and the collector of the transistor. In other words, the series resistor of the detector coil is also connected in series with a capacitor in a shunt network across the series connection of the drive coil and a resistor connecting it to the direct current source. In addition, it has been found to be advantageous to provide a second capacitor in shunt across the series connection of the drive coil and its resistor. With this construction, the first-mentioned capacitor is charged through the series resistor of the detector coil from the collector electrode of the transistor. As a consequence, with large collector currents corresponding to a low collector potential (at the reversing and working points of the angularly oscillating member), the bias voltage at the base electrode is reduced, corresponding to a reduction in the collector current and thus a self-stabilization of the transistor circuit.

Yet another feature of the invention resides in the fact that the aforedescribed circuit arrangement enables the RC network to be recharged through the detecting coil by the potential induced therein without affecting the inductivity of the coil. The bias potential at the base of the electrode is thus a function of the time constant of the RC network. However, the unavoidable signal generated in the control coil by the return swing of the oscillating member has practically no effect on the collector current. As a result, this reverse swing does not damp the oscillation as has occurred in earlier systems when undesired current pulses were triggered by such return movements. In other words, self-sustaining oscillations are maintianed without diminution by spurious signals produced by the return swing of the oscillating mass.

It has also been found that the orientation of the permanent magnets and the coils play an important role in self-sustaining oscillation and freedom from spurious oscillation-damping or oscillation-blocking pulses.

According to the present invention, therefore, the coil arrangement may comprise two substantially adjacent coils in a common plane with the outer turns of one coil practically in contact with the outer turns of the other coil, the coil axes being spaced apart angularly about the axis of oscillation of the rotor and the distance approximately equal to the interaxial spacing of the permanent magnets. One of these coils is therefore the drive coil while the other is the control coil. The permanent magnets, having opposite polarity but parallel induction axes and an interaxial spacing approximately equal to the coil diameters and the interaxial spacing thereof, have induction axes so arranged that they intersect the coils approximately equal to half the coil height. In another embodiment of the invention with similarly effective results, the coil arrangement comprises two generally coplanar but concentric flattened coils, the inner of which is the drive coil while the outer coil is the detecting electromagnetic element. In this case, the oppositely poled but parallel-axis permanent magnets are spaced apart in the direction of movement of the rotor such that the induction axes of the magnets intersect the coils, especially the outer or detector coil, approximately over half the coil height.

With such an arrangement, the induced voltage in the detector coil has the configuration of a three-part signal with a voltage changing at each half cycle to the opposite polarity. In other words, an initial partial pulse of negative polarity is followed by a positive polarity pulse and then another negative polarity pulse or vice versa. The three-part signals will therefore include a main pulse substantially mid-way of each half cycle and leading and trailing secondary pulses of the opposite polarity. The magnets are also spaced such that at the rest or direction-reversal position, the signal has the maximum slope or steepness corresponding to maximum superimposition of the pulse signal and maximum reinforcement. This arrangement has been found also to sharply improve the stability and accuracy of the system.

DESCRIPTION OF THE DRAWING

The above and other objects, features and advantages of the present invention will become more readily apparent from the following description, reference being made to the accompanying drawing in which.

SPECIFIC DESCRIPTION

Figures 1A, 1B, 1C, 1D:
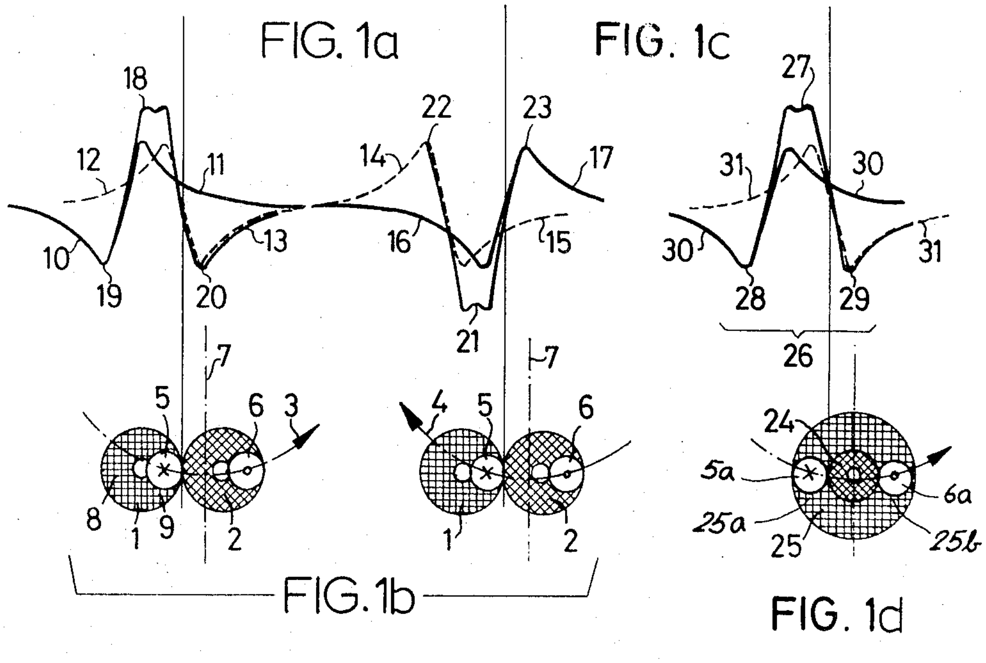
FIG. 1*a* is a graph of the induced voltage plotted along the ordinate against time plotted along the abscissa of a permanent-magnet and coil arrangement according to one embodiment of the invention.
FIG. 1*b* is a diagram illustrating the permanent magnet and coil orientations giving rise to the signals of FIG. 1*a;*
FIG. 1*c* is a diagram similar to FIG. 1*a* but illustrating another embodiment of the invention.
FIG. 1*d* is a diagram similar to FIG. 1*b* but illustrating the positions obtaining for the graph of FIG. 1*c;*

In FIG. 1*a*, there is shown the waveform of the signal obtained at the sensing coil 1 as the magnets 5 and 6 of the rotor swing thereacross, the path of the magnets being illustrated in FIG. 1*b*. FIG. 1*a* is a graph of the amplitude of the signal (voltage pulse) plotted along the ordinate, the abscissa representing time. The magnets 5 and 6 are poled oppositely as represented by the symbols *x* and *o* representing South-North orientation and North-South orientation respectively. The permanent magnets 5 and 6 are carried by the rotor (see FIG. 3*a* through 3*c*) while the coils 1 and 2, the latter being the drive coil, are carried by the stator. Of course, the coils may be provided on the rotor when the latter has electrical conductors adapted to connect the moving coils to the drive circuit (FIG. 2), the permanent magnets being then located with similar positioning upon the stator. A forward swing (counterclockwise) is represented by the arrow 3 which also shows the path taken by the permanent magnets 5 and 6 as they traverse the region above and immediately adjacent the coils 1 and 2. The reverse swing is represented by the arrow 4 and is in a clockwise direction.

As the rotor swings in a clockwise direction (FIG. 1*a* and 1*b*) along the path 3, the magnet 6 sweeps across the first half 8 of the sensing coil 1 to generate a negative pulse 10 (FIG. 1*a*) and then passes over the second half of the coil, represented at 9 to produce the positive pulse 11 as measured as a voltage signal across the coil 1. Somewhat later, a similar pair of pulses of opposite polarity system is obtained as the opposite polarity magnet 5 sweeps across the coil 1. Thus, the positive pulse 12 is formed as the permanent magnet 5 moves across the first half 8 of the coil 1 and reverses to the negative pulse 13 as the magnet continues across the second half 9 of the coil. The resultant signal comprises the leading and trailing negative pulses 19 and 20 separated by a high-amplitude positive pulse 18. The pulses 18 through 20 thus constitute one half-cycle signal. At the right hand side of FIG. 1*a*, the second half-cycle signal has been illustrated.

Thus, during the return swing as represented by the arrow 4, the process is reversed. The permanent magnet 5 swings across the second half of coil 1 first to produce the positive pulse 14 which is transformed into a negative pulse 15 as this magnet covers the first half 8 of the coil. Somewhat thereafter, the permanent magnet 6 swings across the second half 9 of sensing coil 1 to produce the negative pulse 16 which is followed by a positive pulse 17 as the permanent magnet 6 moves across coil half 8. As a consequence, a three-pulse signal 21 through 23 is produced during the second half cycle consisting of resultant positive peaks 22 and 23 separated by a negative peak 21.

Similar results are obtained when an axial coil arrangement is employed as will be apparent from FIGS. 1*c* and 1*d*. In this case, the sensing coil 25 has a diameter at least equal to the interaxial spacing of the permanent magnets while the drive coil 24 is centered within the sensing coil. In the systems of FIGS. 1*a* and 1*b*, the interaxial spacing of the magnets 5 and 6 may be equal to the diameter of the sensing coil 1. In any event, it is preferred that the effective cross section of the permanent magnets 5 and 6, represented by circles in FIGS. 1*b* and 1*d*, be equal to the width of the leading and trailing halves 8 and 9 or 25*a* and 25*b* of the sensing coil. Consequently, as the permanent magnet 6*a* crosses the upstream half 25*a* of the sensing coil 25, the negative pulse 30 is produced which is followed by a positive pulse 30' as this magnet crosses the second half 25*b* of coil 25. Following the magnets 6*a*, of course, is the magnet 5*a* of opposite polarity which produces the positive pulse 31 and then the negative pulse 31'. The resultant signal, represented at 26, is similar in form to that shown at the left hand side of FIG. 1*a* and comprises a pair of negative peaks 28 and 29 on opposite sides of a positive peak 27. During the reverse swing in a clockwise sense, the resultant waveform is similar to that shown at the right hand side of FIG. 1*a*.

Figure 2:
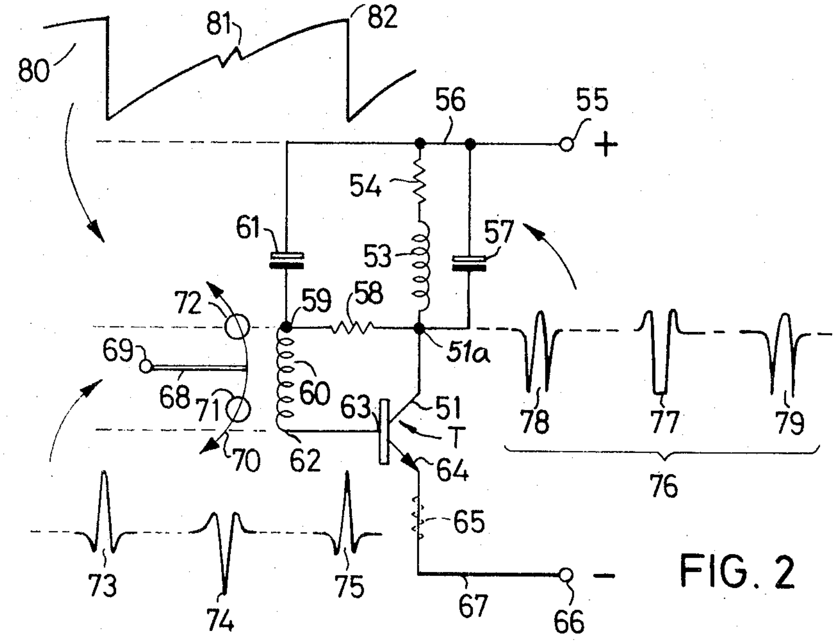
FIG. 2 is a circuit diagram with relevant pulse forms, illustrating the transistor circuit of the present invention.

In FIG. 2, I have shown the circuit for the electronic-clockwork mechanism of the present invention. The circuit basically comprises a transistor T of the NPN type having a collector 51 and an emitter 64 and a base 63. The terminals 55 and 66 can be connected to the positive and negative poles of a single-cell battery, e.g. a dry cell having a potential of about 1.5V or to some other direct-current cource of similar polarity. The direct-current source may be a multicell battery, if desired, or a rectifier conected in turn to an alternating current supply.

The collector electrode 51 is tied at 51*a* to one side of the drive coil 53 whose other terminal is returned through an ohmic resistor 54 to the positive bus bar 56 which, of course, is connected to terminal 55. If desired, the latter may be energized by a primary of secondary cell arrangement, the former being non-rechargeable while the latter may be a storage battery. It is preferred, as already noted, to use a single-cell source (monocell).

A capacitor 57 (forming a tuned network with coil 53) is bridged across the series network of ohmic resistor 54 (damping resistance for the tuned network) and drive coil 53 and thus shunts the busbar 56 to the collector terminal 51*a*. Also connected to the collector 51 at the tie point is an ohmic resistor 58 whose other side is connected to one terminal 59 of the sensing coil 60, the other side 62 of which is connected to the base 63 of transistor T. In other words, the collector 51 is connected through the series network of a resistor 58 and the sensing coil 60 with the base 63 of the transistor I. In addition, a capacitor 61 is connected between the positive bus bar 56 and terminal 59 of the sensing coil 60, i.e. to the side of this coil which is remote from the base 63 of transistor T. The capacitor 61 also lies in shunt across the series network formed by ohmic resistor 54, drive coil 53 and ohmic resistor 58.

The circuit thus provides a series network of the sensing coil 63 and the condenser 61, one part of which — namely the condenser 61 — is also in series with the drive coil in a series network shunted by the resistor 58.

The emitter electrode 64 is connected via a resistor 65 (shown in broken lines to represent a circuit element which is preferred but not essential) to the negative bus bar 67 and the negative terminal 66. If it is desired to substitute a PNP transistor for the NPN transistor T, it is merely necessary to reverse the applied polarity.

In FIG. 2, I have also shown the cooperation of the drive and sensing coils 53 and 60 with the magnetic arrangement in which the rotor is represented by an arm 68 whose axis can be seen at 69. The permanent magnets 71 and 72 then swing back and forth along the path represented by the arrow 70. The induced voltage in the sensing coil is represented by the pulse train 73 through 75 of which the positive spikes 73 and 75 trigger the transistor T into conductivity. Because of the coupling between the drive and the sensing coils 53 and 60 the effect is multiplied. The voltage developed at the collector 51 is represented by the pulse train 76, the pulse 77 corresponding to the current flow at positive input signals 73 and 75.

Because of the magnitude of the current pulse 77, coinciding with the sharp drop in the collector potential at this time, resistor 58 permits the capacitor 61 to charge whereby the operating point or threshold of the base electrode 63 is shifted toward a smaller bias voltage to reinforce the amplification effect. This blocking voltage, as in the case of a normal blocking oscillator, drops slowing in accordance with the time constant determined by resistor 58 and capacitor 61 which form a RC network. However, the amplification of the transistor T is, over the duration of a half cycle, not yet so great that the positive leading and trailing portions of pulse 74, when developed in the control coil 60, are able to trigger the transistor T. These portions of the signal appear only as brief short-voltage pulses 78 and 79 at the drive coil 53, the inductance of which is sufficient to prevent these pulses from having any effect as current pulses.

The RC network 58, 61 is of the relaxation or saw-tooth oscillator type with an output represented by the voltage pulses 80. Upon the latter, the opposite polarity pulses are superimposed as minor perturbation 81. Only when the voltage across the capacitor 61 and, accordingly, at the base 63 of the transistor T (via the sensing coil 60) has reached the value represented by the maximum 82, is the transistor triggered by a corresponding positive pulse 73 or 75 as appears at the control coil 60. The circuit has, consequently, the advantage that the base-electrode bias can be held to a small value in the case where the maximum voltage 82 at the condenser is also held to a low value, the induced voltage at the control coil 60 being used at full amplitude. Because no parallel low resistance is provided therefor, the circuit has a specially low current drain.

The construction of the time-keeping mechanism according to the present invention is illustrated in FIGS. *3a* through *3c* and FIGS. *3b* and *3e* for the embodiments represented diagrammatically in FIGS. *1b* and *1d* respectively. Many of the structural features of the mechanism are identical to those described and illustrated in my copending application mentioned earlier.

In the embodiment of FIGS. *3a* through *3c*, a support plate 101 is provided and is connected to the face 102 of the clock in the usual manner. For this purpose, spacing posts 103 and 104 are provided and carry a guide plate 105 shown in dotted-line in FIG. *3b*. In the base plate 101 and the guide plate 105, a shaft 106 is journaled and carries the oscillatory rotor 107. Plates 101, 102 and 105 constitute part of the stator.

Figures 3A, 3B, 3C, 3D, 3E:
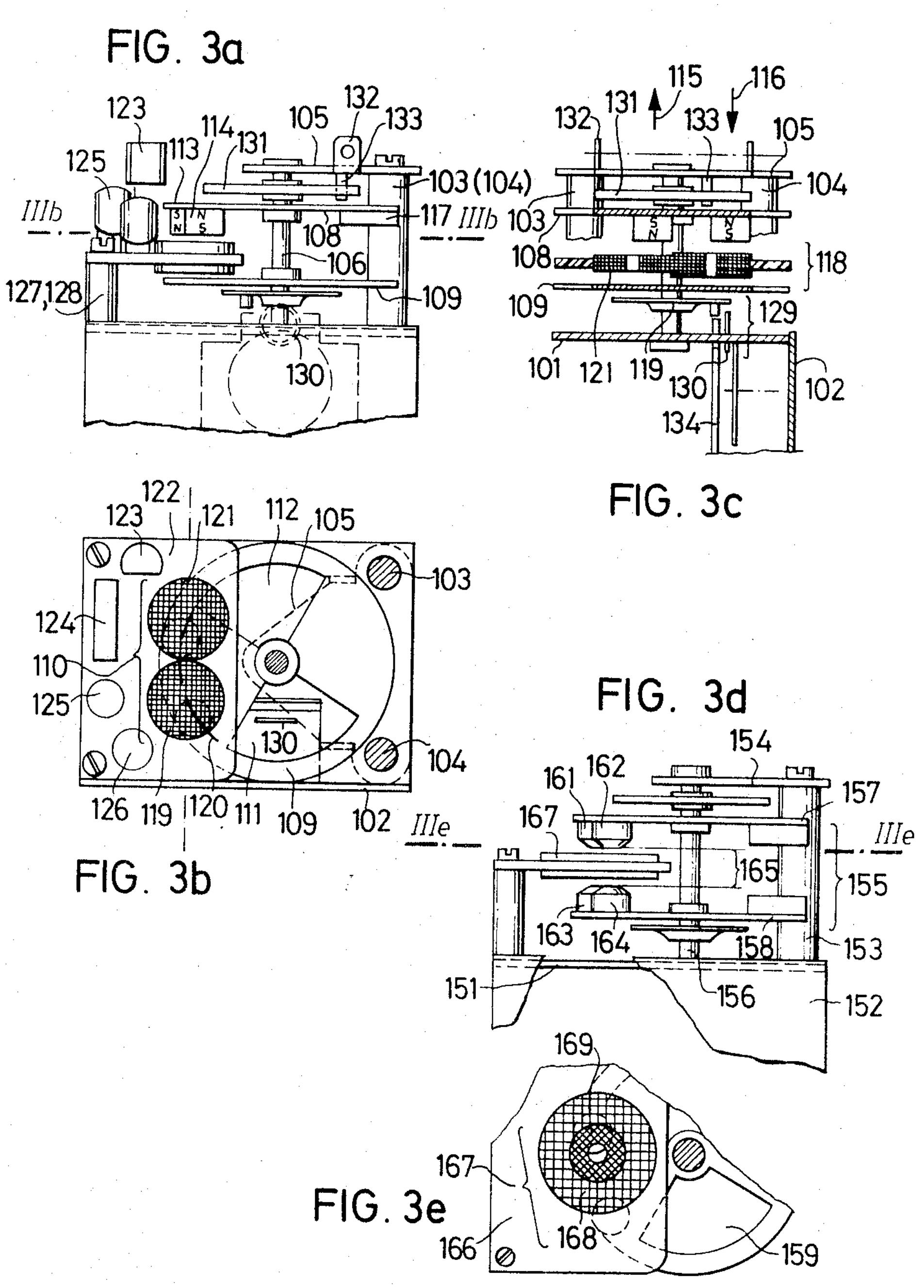
FIG. 3*a* is a vertical elevational view, partly broken away and partly in diagrammatic form of a clockwise mechanism according to the invention.
FIG. 3*b* is a section taken along the line III*b* — III*b* of FIG. 3*a;*
FIG. 3*c* is a vertical section through parts of the mechanism of FIG. 3*a* in a plane perpendicular to the viewing plane of FIG. 3*a;*
FIG. 3*d* is a view similar to FIG. 3*a* but illustrating another embodiment of the invention.
FIG. 3*e* is a cross section taken along the line III*e* — III*e* of FIG. 3*d*.

The shaft 106 carries a pair of soft-iron disks 108 and 109 which, in order to reduce the weight and avoid undesired damping because of eddy currents, the disks are provided with quarter-circular-segmental cutouts 111 and 112. In FIG. 3b, because of the section plate, only the lower disk 109 is visible. The upper disk 108 carries on its underside a pair of small cylindrical permanent magnets 113, 114 which are identical to the magnets 5 and 6 or 71 and 72 mentioned earlier. The magnets have parallel but spaced-apart induction axes and are of opposite polarity as will be apparent from the N, S, notation representing the poles. Arrows 115 and 116 also signify the polarization direction of these magnets. On the disk 108 at a diametrically opposite location there is provided a weight 117 to balance the weight of the permanent magnets and prevent vibration. The center of gravity of the disk 108 thus lies at its center of rotation and the latter can be termed a balance wheel.

The permanent magnets 113 and 114 are swingable across a coil arrangement generally represented at 110 and are separated therefrom by a small air gap 118. Consequently, the magnetic circuit is closed through the coil arrangement 110, which is cantilevered from the stator between the two disks 108 and 109, through these disks to increase the effective flux in a direction perpendicular to the plane of displacement of the magnet. The coil arrangement 110 is traversed by magnetic lines of force practically only as the magnets sweep across the coils, the lines of force being parallel to the shaft 106. The coil arrangement 110 comprises a drive coil 119 (identical in all respects to the drive coils 2 and 52 already described) so that the magnetic field produced by this coil applies a force tangentially to the permanent magnets to displace the same along the circular path 120 about the axis of shaft 106.

The drive coil 119 may be wound with heavier wire (higher current carrying capacity) and fewer turns than the control or sensing coil 121 which therefore may have a larger number of turns of smaller diameter. The sensing coil 121 of the coil arrangement 110 is carried by a plate 122 of electrically insulating material and may be embedded and encapsulated or potted therein. The plate 122 may be a printed-circuit plate for the components of the electronic arrangement in which the transistor 123, the resistor 124, the condensers 125 and 126 are counterparts of the transistor T, the condensers 57 and 61 and the resistor 58. The plate 122 is mounted by posts 127 and 128 upon the support plate 101.

The remainder of the clock mechanism has not been shown in detail and any conventional clockwork arrangement, e.g. as described in my aforementioned copending application, may be used. The system may include a geneva or pawl and ratchet arrangement represented at 129, a spiral spring seen at 131, one end of which is connected to the shaft 106, and a pin 133 to which the other end of the spiral spring is connected. To adjust the clock timing, this pin is carried by a movable lug 132 which can be shifted by a threaded spindle (not shown) to increase or decrease the tension on the spring. When a pendulum or weight-return arrangement is provided for the balance wheel the spiral spring may be dispensed with. The housing surrounding the clockwork (not shown) is preferably of an electrically insulating and partially transparent material so that the movement of parts between the front plate 102 and the rear wall 134 can be seen. The housing should include a battery case for a disposable (primary) single-cell direct-current source. In practice, once the balance wheel is set in motion the pulses 73 through 75 will be generated as the magnets sweep across the coils to operate the transistor 63 as already described to produce current surges in the drive coils 119, 53 and 2 imparting tangential force to the balance wheel in the direction opposite that in which the spring is effected. When the tangential force terminates, the spring restores the balance wheel and the process is repeated.

The system of FIGS. *3d* and *3e* operates similarly and comprises a support plate 151, a face plate 152 mounted upon posts 153 and connected thereby to the support plate 151, and a guide plate 154 likewise carried by the supports. The rotor 155 comprises a pair of soft magnetic disks 157 and 158 with segmental cutouts 159 and 160 mounted upon a shaft 156 journaled in the aforementioned plates.

A pair of small permanent magnets 162 and 164 are provided in alignment with an oppositely facing direction on the two disks 157 and 158 across the gap in which the coil arrangement is positioned. These magnets have the same direction of polarization perpendicular to the plane of their displacement and parallel to the axis of oscillation. A pair of oppositely poled magnets 161 and 163 are spaced from the first mentioned pair of magnets and likewise have between them the same direction of polarization, being secured respectively to the disks 157 and 158. Counterweights 170 and 171 are provided on the disks 157 and 158 to locate the center of gravity of the latter at the oscillation axis. In the embodiment illustrated, the permanent magnets frustoconically converge toward each other and the intervening gap 165 to increase the magnetic-flux to concentrate the latter.

In the air space 165 between the magnets of both pairs, there is provided a support plate 166 of synthetic-resin material in which is embedded the flattened coil 167 consisting of two concentric windings for the sensing coil 168 and the drive coil 169 respectively. The coils have been symbolically represented in FIG. *3e* by cross hatching of different orientations. The plate 166 also is a printed circuit plate on which the circuit elements are mounted as previously described. Except for the fact that the pulse train has the configuration illustrated in FIG. 1c, the system of FIGS. 3d and 3e operates similarly to the arrangement already described.

I claim:

1. An electronic oscillatory drive for a clockwork or like mechanism comprising:

a rotor member and a stator member, said rotor member being oscillatory about an axis relative to said stator member;

a pair of permanent magnets spaced apart on one of said members in the direction of oscillation of said rotor member and having generally parallel induction axes but opposite magnetic polarization directions;

electromagnetic coil means on the other of said members sweepingly juxtaposed with said permanent magnets upon oscillation of said rotor member and including a drive winding energizable to interact with said permanent magnets to displace said rotor member, and a sensing winding responsive to displacement relative to said permanent magnets for generating input signals, said windings having respective magnet axes generally parallel to the induction axes of said magnets; and a control circuit responsive to said input signals for energizing said drive winding, said control circuit including a transistor constituting the sole transistor of the drive, first means for connecting said drive winding in circuit with the collector of said transistor and a direct-current voltage source, a first resistor connected in series with a first terminal of said sensing winding and the collector of said transistor, second means for connecting a second terminal of said sensing winding in series with the base of said transistor, and a capacitor connected between said source and said first terminal of said sensing winding.

2. The drive defined in claim 1 wherein said drive winding is in series with said collector of said transistor further comprising a condenser connected between said source and said collector of said transistor and bridged across said drive winding.

3. The drive defined in claim 1 further comprising a second resistor connected in series with said drive winding to said source.

4. The drive defined in claim 2 wherein said transistor is of the NPN type, and said drive winding is connected in circuit between said collector and a positive terminal of said source, the emitter of said transistor being connected to the negative terminal of said source, said source being a single dry cell, said circuit including further a second resistor connected in series with said drive winding to said source, said condenser being connected across both said drive winding and said second resistor.

5. The drive defined in claim 4 wherein said electromagnetic coil means comprises a pair of coils in adjacent substantially contacting relationship, one of said coils constituting said sensing winding and the other of said coils constituting said drive winding.

6. The drive defined in claim 4 wherein said windings are coaxial, with said sensing winding surrounding said drive winding.

7. The drive defined in claim 4 wherein said permanent magnets frustoconically converge in the direction of said electromagnetic coil means.

8. The drive defined in claim 4 wherein said permanent magnets each have an effective magnetic cross section at most equal to half the width of said sensing winding.

9. The drive defined in claim 4 wherein said electromagnetic coil means is mounted upon a printed-circuit plate carrying said control circuit.

10. The drive defined in claim 4 further comprising a support, said stator member being mounted on said support and carrying said electromagnetic coil means, said rotor member comprising a pair of axially spaced soft-magnetic disks carrying said permanent magnets, said disks being provided with segmental cutouts and a weight for counterbalancing said permanent magnets, said stator member being provided with a printed-circuit plate carrying said transistor, said condenser, said capacitor and at least one of said resistors and reaching between said disks, said windings being at least in part embedded in said printed circuit plate.

11. An electronic oscillatory drive for a clockwork or like mechanism comprising:

a rotor member and a stator member, said rotor member being oscillatory about an axis relative to said stator member;

a pair of permanent magnets spaced apart on one of said members in the direction of oscillation of said rotor member and having generally parallel induction axes but opposite magnetic polarization directions;

electromagnetic coil means on the other of said members sweepingly juxtaposed with said permanent magnets upon oscillation of said rotor member and including a drive winding energizable to interact with said permanent magnets to displace said rotor member, and a sensing winding responsive to displacement relative to said permanent magnets for generating input signals, said windings having respective magnet axes generally parallel to the induction axes of said magnets;

a control circuit responsive to said input signals for energizing said drive winding, said control circuit including a transistor, means for connecting said drive winding in series with the collector-emitter network of said transistor and a direct-current source, means for connecting said sensing winding in circuit between the collector and base of said transistor, a capacitor connected between said source and a terminal of said sensing winding remote from the base of said transistor, said drive winding being connected in series with said collector of said transistor and a condenser bridged across said drive winding and connected between said source and said collector.

12. The drive defined in claim 11 wherein said transistor is of the NPN type, further comprising a first resistor connected in series with said drive winding and a positive terminal of said source to said collector, and a second resistor connected between said collector and said terminal of said sensing winding, the other terminal of said sensing winding being connected to said base, said capacitor and said second resistor lying in series across a series network formed by said first resistor and said drive winding, said condenser being connected across said series network, the emitter of said transistor being connected to the negative terminal of said source, said source being a single dry cell.

13. The drive defined in claim 11 wherein said electromagnetic coil means comprises a pair of coils in adjacent substantially contacting relationship, one of said coils constituting said sensing winding and the other said coils constituting said drive winding.

14. The drive defined in claim 11 wherein said windings are coaxial, with said sensing winding surrounding said drive winding.

15. The drive defined in claim 11 wherein said permanent magnets frustoconically converge toward the direction of said electromagnetic coil means.

16. The drive defined in claim 11 wherein said permanent magnets each have an effective magnetic cross section at most equal to half the width of said sensing winding.

17. The drive defined in claim 11 wherein said electromagnetic coil means is mounted upon a printed-circuit plate carrying said control circuit.

18. The drive defined in claim 11, further comprising a support, said stator member being mounted on said support and carrying said electromagnetic coil means, said rotor member comprising a pair of axially spaced soft-magnetic disks each carrying two permanent-magnet members, the permanent-magnet members of the two disks being aligned to form said permanent magnets, said disks being provided with segmental cutouts and a weight for counterbalancing said permanent magnets, said stator member being provided with a printed-circuit plate carrying said transistor, said condenser, said capacitor and at least one of said resistors and reaching between said disks, said windings being at least in part embedded in said printed circuit plate.

* * * * *